US010698227B2

(12) United States Patent
Yeung (10) Patent No.: US 10,698,227 B2
(45) Date of Patent: Jun. 30, 2020

(54) APPARATUS FOR COMBINING LASER BEAMS

(71) Applicant: CHRISTIE DIGITAL SYSTEMS USA, INC., Cypress, CA (US)

(72) Inventor: Oscar Yeung, Waterloo (CA)

(73) Assignee: CHRISTIE DIGITAL SYSTEMS USA, INC., Cypress (*) Notice: Subject to any disclaimer, the term of this patent is extended or adjusted under 35 U.S.C. 154(b) by 165 days.

(21) Appl. No.: 16/100,531

(22) Filed: Aug. 10, 2018

(65) Prior Publication Data

US 2019/0049744 A1  Feb. 14, 2019

Related U.S. Application Data

(60) Provisional application No. 62/544,360, filed on Aug. 11, 2017.

(51) Int. Cl.
*G02B 27/28* (2006.01)
*G02B 1/11* (2015.01)

(52) U.S. Cl.
CPC .............. *G02B 27/283* (2013.01); *G02B 1/11* (2013.01)

(58) Field of Classification Search
CPC ...... G02B 27/283; G02B 27/285; G02B 5/30; G02B 5/3066; G02B 5/3083; G02B 6/2706; G02B 6/272; G02B 27/126
See application file for complete search history.

(56) References Cited

U.S. PATENT DOCUMENTS

| 4,548,478 | A | 10/1985 | Shirasaki et al. |
| 5,835,270 | A | 11/1998 | Urino et al. |
| 6,546,165 | B2 * | 4/2003 | Yoon .................. G02B 6/29302 359/489.01 |
| 6,608,723 | B2 | 8/2003 | Xie |
| 7,081,996 | B2 | 7/2006 | Wills et al. |
| 9,348,157 | B2 | 3/2016 | Kurokawa et al. |
| 9,323,069 | B2 | 4/2016 | Janssen |
| 2004/0212883 | A1 * | 10/2004 | Jacobsen .............. G02B 27/283 359/485.02 |
| 2004/0252743 | A1 * | 12/2004 | Anikitchev ............ G02B 27/09 372/97 |

* cited by examiner

*Primary Examiner* — William R Alexander
*Assistant Examiner* — Ephrem Z Mebrahtu
(74) *Attorney, Agent, or Firm* — Perry + Currier Inc.

(57) ABSTRACT

The specification is directed to an apparatus for combining laser beams having a same polarization. The apparatus includes a prism having a prism body and a plurality of surfaces, and a crystal coupled to the prism, the crystal having a crystal body and formed of a birefringent material. The prism is configured to receive two laser beams each having a same input linear polarization, totally internally reflect the first laser beam off one or more of the plurality of surfaces to change the linear polarization of the first beam to an orthogonal polarization, refract the second laser beam, and output the laser beams parallel to each other, and having orthogonal polarizations. The crystal is configured to receive the laser beams from the prism and combine them to form an orthogonally polarized combined laser beam.

12 Claims, 8 Drawing Sheets

FIG. 8C

APPARATUS FOR COMBINING LASER BEAMS

FIELD

The specification relates generally to optical devices, and specifically to an apparatus for combining laser beams.

BACKGROUND

Polarization combining is an optical method that combines two linearly polarized beams into one beam with the power and polarization orientations of both initial beams. Polarization combining can be achieved using an optical assembly having a beam-splitter coating on a plate or cemented inside an optical cube. The optical assembly receives the initial beams having S & P polarizations and combines them using transmission and reflection.

SUMMARY

An aspect of the specification is directed to an apparatus for combining laser beams including: a prism having a transparent prism body and a plurality of surfaces, the prism configured to: receive a first laser beam and a second laser beam each having a same input linear polarization; totally internally reflect the first laser beam off ones of the plurality of surfaces on which said first laser beam impinges at greater than or equal to a critical angle $\theta_c$ to change the linear polarization of the first beam to an orthogonal polarization; refract the second laser beam off ones of the plurality of surfaces on which said second beam impinges at less than said critical angle $\theta_c$, thereby maintaining said input linear polarization; output the first laser beam having said orthogonal polarization; output the second laser beam parallel to the first laser beam having said input linear polarization; and a crystal coupled to the prism, the crystal having a transparent crystal body formed of a birefringent material, the crystal configured to: receive the first laser beam and the second laser beam from said prism; combine the first laser beam and the second laser beam to form an orthogonally polarized combined laser beam; and output the orthogonally polarized combined laser beam.

According to an implementation, the prism includes a first input surface, a second input surface, a first output surface and a second output surface arranged such that: the first input surface is configured to transmit the first laser beam into the prism body; the second input surface is configured to transmit the second laser beam into the prism body; the first output surface is configured to transmit the first laser beam out of the prism body with the orthogonal polarization; and the second output surface is configured to transmit the second laser beam out of the prism body with the input linear polarization.

According to an implementation, the crystal includes a third input surface and a third output surface arranged such that: the third input surface is configured to transmit the first laser beam and the second laser beam output from the prism into the crystal body; and the third output surface is configured to output the combined laser beam.

According to an implementation, the apparatus further comprises one or more anti-reflective coatings on at least a portion of one or more of: the first input surface, the second input surface, the first output surface, and the second output surface.

According to an implementation, the apparatus further comprises one or more anti-reflective coatings on at least a portion of one or more of: the third input surface and the third output surface.

According to an implementation, the prism is configured to receive the first laser beam parallel to the second laser beam.

According to an implementation, the prism is configured to receive the first laser beam perpendicular to the second laser beam.

According to an implementation, the prism comprises one of: a pentaprism and an octaprism.

According to an implementation, the prism comprises one of: SF10 glass, and 2 LLF glass.

According to an implementation, the crystal comprises calcite.

According to an implementation, the apparatus further comprises a bonding layer configured to bond a first output surface of the prism to a bonding portion of a third input surface of the crystal.

According to an implementation, the prism is arranged such that: the first laser beam is transmitted from the first output surface of the prism directly to the bonding portion of the crystal via the bonding layer; and the second laser beam is transmitted out of the prism via a second output surface of the prism and received by the crystal at a non-bonding portion of the third input surface.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
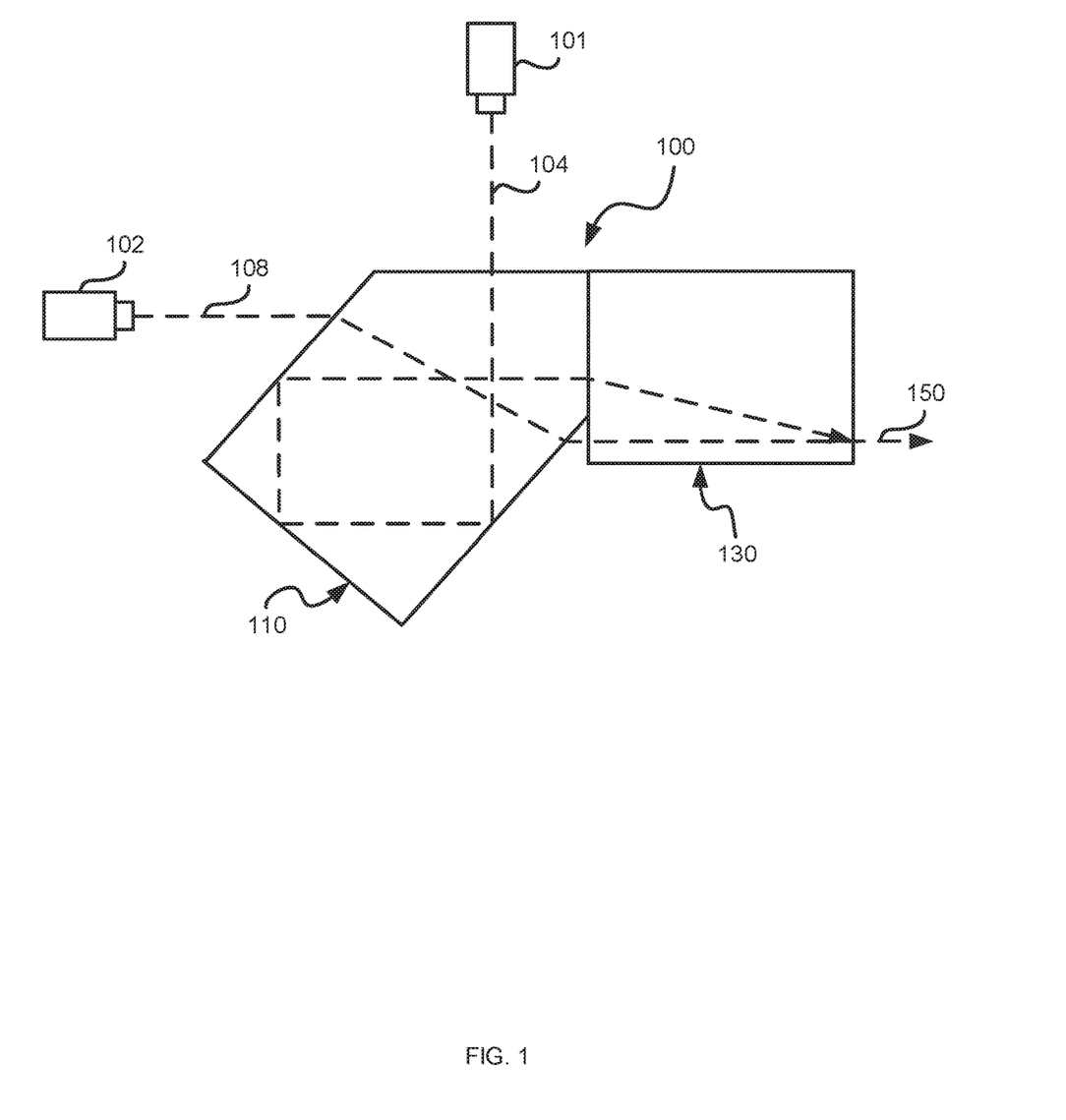
FIG. 1 depicts an example apparatus for combining two laser beams, according to a non-limiting implementation.

FIG. 1 depicts a schematic view of an optical system including a first laser 101, a second laser 102, and an apparatus 100 for combining laser beams.

The first laser 101 and the second laser 102 are configured to emit, respectively, a first laser beam 104 and a second laser beam 108. The first laser beam 104 and the second laser beam 108 are linearly polarized, and in particular, have a same linear polarization. In some implementations, the lasers 101 and 102 are generally configured to emit a single color and/or wavelength of laser beam, for example green. The lasers 101 and 102 may emit other colors, including, but not limited to, blue and red. Furthermore, while it is assumed herein that the laser beams 104 and 108 have the same color, in other implementations, the laser beams 104 and 108 may be different colors and/or wavelengths. Furthermore the color(s) and/or wavelength(s) of the laser beams 104 and 108 emitted by the lasers 101 and 102 may be visible to a human vision system (e.g. a human being) and/or a machine vision system that is configured to detect color(s) and wavelength(s) similar to a human being or invisible to a human vision system and may include wavelengths in one or more of visible range, an infrared range and an ultraviolet range.

The apparatus 100 is generally configured to receive the laser beams 104 and 108 having the same input linear polarization and output a combined laser beam 150 which is orthogonally polarized, as will be described further below. The apparatus 100 includes a prism 110 generally configured to receive the laser beams 104 and 108 having the same input linear polarization and output the laser beams 104 and 108 in a parallel direction and having orthogonal linear polarizations. In particular, the prism 110 includes one or more total internal reflection (TIR) surfaces configured to totally internally reflect at least one of the laser beams 104 and 108 to change the respective linear polarization. The apparatus further includes a crystal 130 coupled to the prism 110 and generally configured to receive the laser beams 104 and 108 having orthogonal linear polarizations and combine them into the orthogonally polarized (i.e. including both of the orthogonal linear polarizations) combined laser beam 150.

Figure 2A:
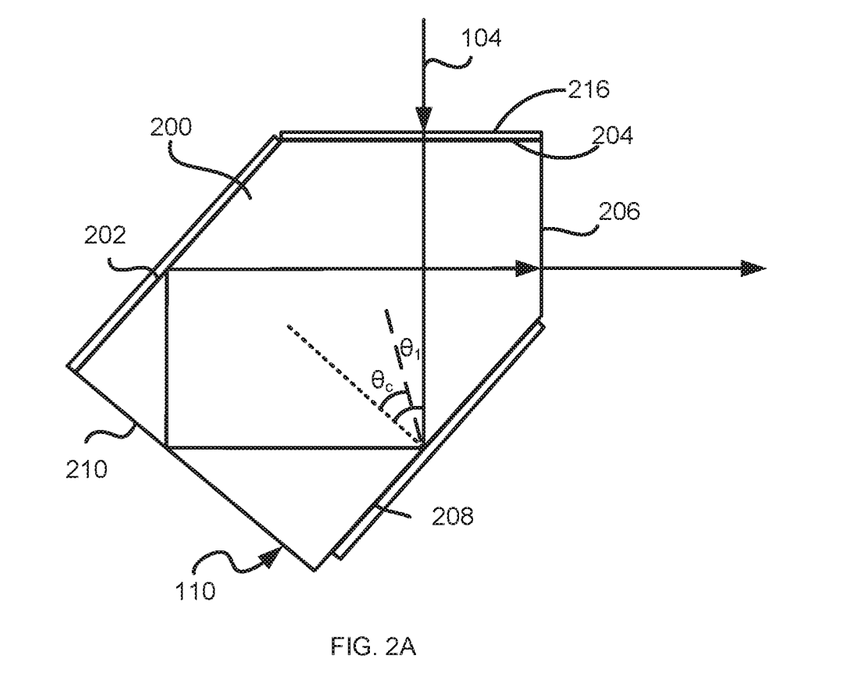
FIGS. 2A and 2B depict optical paths of the laser beams in a prism of the apparatus of FIG. 1, according to a non-limiting implementation.
Figure 2B:
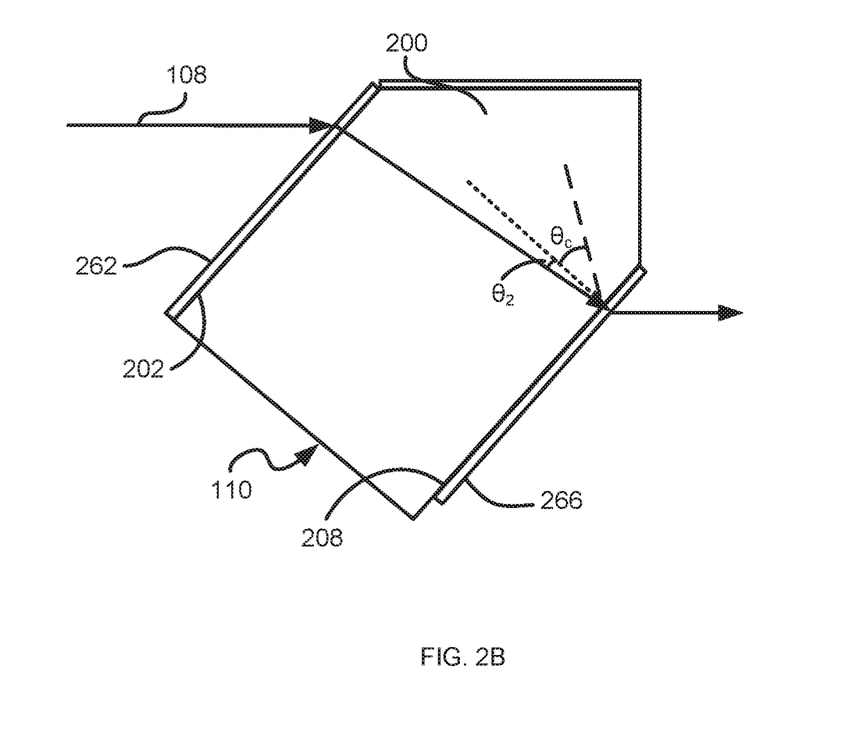

Referring now to FIGS. 2A and 2B, the prism 110 and the paths of the laser beams 104 and 108 will be described in greater detail. Referring to FIG. 2A, the prism 110 includes a transparent prism body 200 including surfaces 202, 204, 206, 208 and 210 forming, in the illustrated example, a pentaprism. The transparent prism body 200 comprises an optical material that is transparent to the laser beams 104 and 108, including, but not limited to glass, optical plastic, and the like. As will be discussed further below, the optical material of the prism body 200 is selected according to optical properties (e.g. the refractive index) of the material.

In the present example, the prism body 200 comprises SF10 glass having a refractive index of about 1.73. Accordingly, the critical angle $\theta_c$ of the prism body 200 is defined, in accordance with Snell's Law, given at equation (1), as the angle of incidence of a ray of light (e.g. laser beam 104 or 108) for which the angle of refraction (i.e. the transmission angle $\theta_t$) is 90°.

$$n_1 \sin \theta_i = n_2 \sin \theta_t \quad (1)$$

wherein $n_1$ is the refractive index of the prism body 200, $n_2$ is the refractive index of air, $\theta_i$ is the angle of incidence, and $\theta_t$ is the angle of transmission. Solving equation (1) results in a critical angle $\theta_c$ of the prism body 200 having SF10 glass type of about 35°. Thus, when the angle of incidence $\theta_i$ of the laser beams 104 or 108 is greater than about 35°, the laser beam 104 or 108 is totally internally reflected within the prism body 200. In accordance with the Fresnel equations, the laser beam 104 or 108 also undergoes a phase shift upon total internal reflection, with the degree of the phase shift being dependent upon the angle of incidence $\theta_i$ and the index of refraction of the optical material of the prism body 200, as will be described further below. When the angle of incidence $\theta_i$ of the laser beams 104 or 108 is less than about 35°, the laser beam 104 or 108 is transmitted (and refracted) through the surface of the prism body 200.

The prism body 200 therefore defines surfaces thereon and is shaped to receive the laser beams 104 and 108, totally internally reflect at least one of the laser beams 104 and 108 to change the respective linear polarization and output the laser beams 104 and 108 with orthogonal linear polarizations. In the present example, the prism body 200 forms a pentaprism to totally internally reflect the laser beam 104 three times, and to refract the laser beam 108 therethrough.

The surfaces 202, 204, 206, 208, and 210 are generally arranged, relative to the laser 101 such that the surface 204 acts as a first input surface configured to transmit the first laser beam 104 into the prism body 200 and the surface 206 acts as a first output surface configured to transmit the first laser beam 104 out of the prism body 200. In other words, the laser beam 104 is received at the first input surface 204 and is transmitted through the first input surface 204 into the prism body 200. In some implementations, at least a portion of the first input surface 204 can include an anti-reflective coating 216 specially configured to transmit the laser beam 104 through the first input surface 204 with minimal loss from reflection. For example, the anti-reflective coating 216 can be specially configured to transmit the laser beam 104 at the incident angle (in the illustrated example, the incident angle is 0° from a normal to the first input surface 204). In some implementations, the anti-reflective coating 216 is localized around the area through which the laser beam 104 is transmitted (i.e. the anti-reflective coating 216 does not cover the entire first input surface 204).

Having entered the prism body 200, the first laser beam 104 continues through the prism body 200 to the surface 208. The laser beam 104 is incident upon the surface 208 at an angle of about 45°, and hence the surface 208 acts as a total internal reflection (TIR) surface and the laser beam 104 undergoes total internal reflection within the prism body 200. Similarly, the laser beam 104 undergoes total internal reflection upon incidence at surfaces 210 and 202.

Figure 8A:
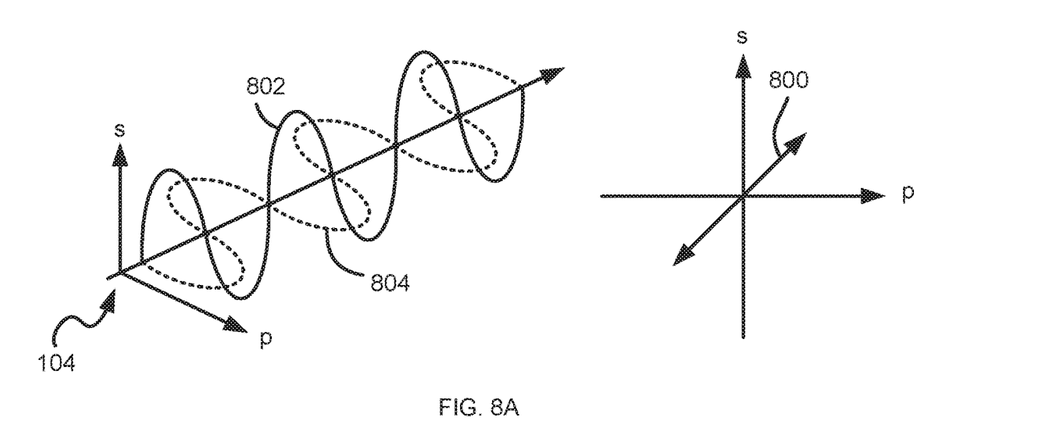
FIGS. 8A, 8B and 8C show phase shifting of s and p components of the laser beams due to total internal reflection within the prism.
Figure 8B:
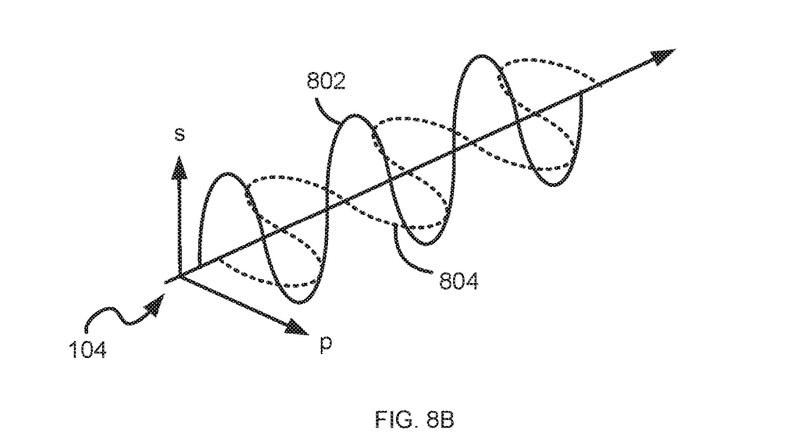
Figure 8C:
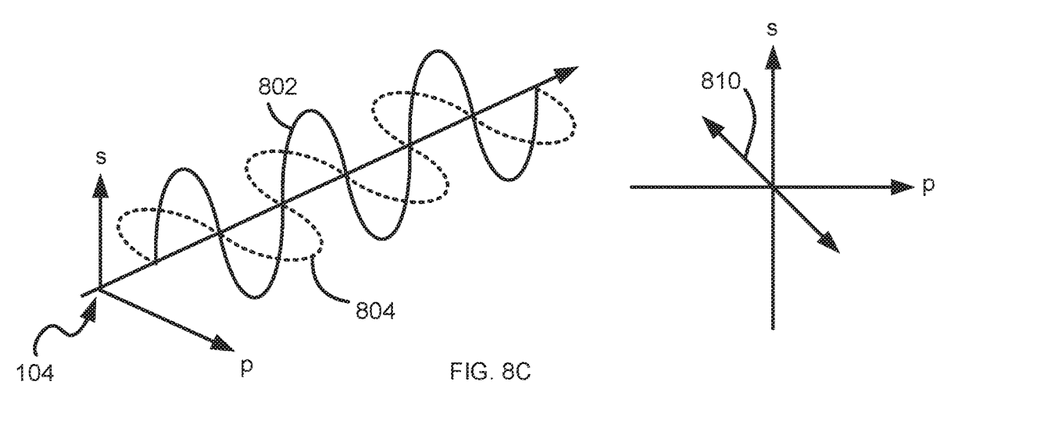

In particular, in the present example, the first laser beam 104 is phase shifted at each total internal reflection such that the resulting output linear polarization of the first laser beam 104 is orthogonal to the input linear polarization. For example, referring to FIG. 8A, the laser beam 104 is shown being linearly polarized in a direction 800 of about 45° with respect to the s and p planes. The laser beam 104 can be decomposed into s and p components, as illustrated by the waveforms 802 and 804. Upon total internal reflection, in particular for the prism body 200 comprising SF10 glass and an incident angle of 45°, the p component (as illustrated by waveform 804) may be advanced by ⅙ of a cycle (i.e. 60°) relative to the s component. Thus, after one total internal reflection, the waveforms 802 and 804 are out of phase, as shown in FIG. 8B. FIG. 8C depicts the waveforms 802 and 804 of the s and p components after three total internal reflections. In particular, the p component has advanced by ½ of a cycle (i.e. 180°) relative to the s component and hence the laser beam 104 is once again linearly polarized in a direction 810, which is perpendicular to the direction 800.

Finally, the laser beam 104 is transmitted through the first output surface 206 out of the prism body 200.

Referring now to FIG. 2B, the surfaces 202, 204, 206, 208, and 210 are generally arranged, relative to the laser 102, such that the surface 202 acts as a second input surface is configured to transmit the second laser beam 108 into the prism body 200 and the surface 208 acts as a second output surface and is configured to transmit the second laser beam 108 out of the prism body 200. In other words, the second laser beam 108 is received at the second input surface 202 and is transmitted through the second input surface 202 into the prism body 200. In some implementations, the second input surface 202 can include an anti-reflective coating 262 specially configured to transmit the laser beam 108 through the second input surface 202 with minimal loss from reflection. For example, the anti-reflective coating 262 can be specially configured to transmit the laser beam 108 according to the incident angle (in the illustrated example, the incident angle is about 45° from a normal to the second input surface 202). In some implementations, the anti-reflective coating 262 can be localized around the area through which the laser beam 108 is transmitted (i.e. the anti-reflective coating 262 does not cover the entire second input surface 202). In the illustrated example, the laser beam 108 refracts as it enters the prism body 200, in accordance with Snell's Law.

The laser beam 108 then travels through the prism body 200 and is transmitted through the second output surface 208 out of the prism body 200. In some implementations, the second output surface 208 can include an anti-reflective coating 266 specially configured to transmit the laser beam 108 through the second output surface 208 with minimal loss from reflection. For example, the anti-reflective coating 266 can be specially configured to transmit the laser beam 108 according to the incident angle (in the illustrated example, the incident angle is about 5° from a normal to the surface 208). In some implementations, the anti-reflective coating 266 can be localized around the area through which the laser beam 108 is transmitted (i.e. the anti-reflective coating 266 does not cover the entire second output surface 208). In the illustrated example, the laser beam 108 refracts as it exits the prism body 200, in accordance with Snell's Law.

In some implementations, a surface of the prism 110 can act as both a TIR surface and an input and/or output surface, based on the angle of incidence of the laser beam 104 or 108 on the surface. For example, consider the surface 208. The first laser beam 104 strikes the surface 208 at an angle $\theta_1$ which is greater than the critical angle $\theta_c$ (i.e. about 35° in the present example), and hence the surface 208 acts as a TIR surface, as illustrated in FIG. 2A. In contrast, the second laser beam 108 strikes the surface 208 at an angle $\theta_2$ which is less than the critical angle $\theta_c$ (i.e. about 35° in the present example), and hence the surface 208 acts as an output surface and the second laser beam 108 is transmitted and refracted therethrough, as illustrated in FIG. 2B.

Thus, in the present example, the prism 110 receives the first laser beam 104 and the second laser beam 108 perpendicular to each other, and each having the same input linear polarization. The first laser beam 104 is totally internally reflected three times to phase shift the first laser beam 104 to have an orthogonal linear polarization to the input linear polarization (i.e. the first laser beam 104 experiences a half wave sum retardance as a result of three total internal reflections) and to change the direction of the first laser beam to be parallel to that of the second laser beam 108. The second laser beam 108 is refracted as it is transmitted into and exits out of the prism body 200 to maintain its original direction and input polarization. Accordingly, the prism 110 outputs the laser beams 104 and 108 parallel to each other and having orthogonal linear polarizations.

In other implementations, the prism 110 can be configured such that both the first laser beam 104 and the second laser beam 108 undergo TIR to change the polarization and/or direction of the laser beams 104 and 108. More generally, the optical material and geometry of the prism body 200 are selected to cooperate to provide TIR surfaces to receive the laser beams 104 and 108 having the same linear polarization, and output the laser beams 104 and 108 directionally parallel, and having relative orthogonal linear polarizations (i.e. one of the laser beams 104 or 108 experiences a half wave sum retardance relative to the other).

Figure 3:
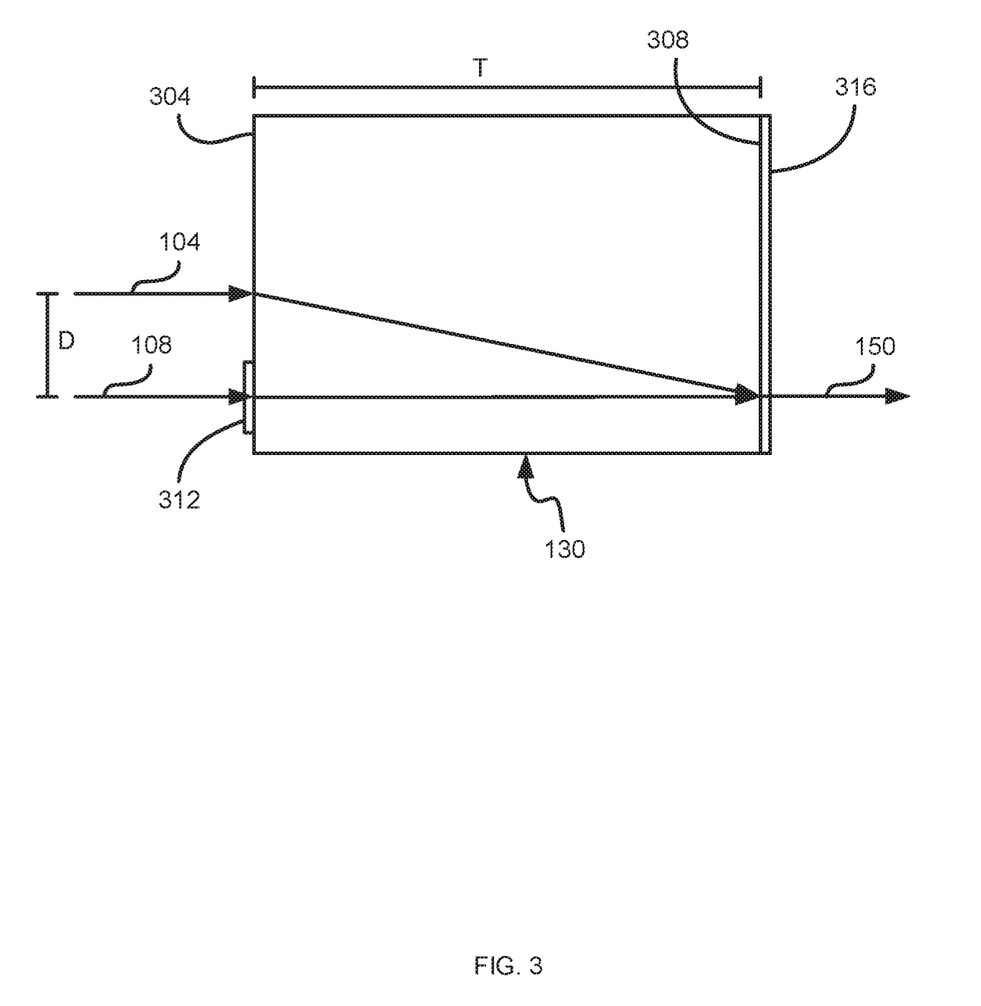
FIG. 3 depicts optical paths of the laser beams in a crystal of the apparatus of FIG. 1, according to a non-limiting implementation.

Referring now to FIG. 3, the crystal 130 includes a transparent crystal body 300 including an input surface 304 and an output surface 308. The crystal body 300 comprises an optical material that is transparent to the laser beams 104 and 108 and having birefringent properties, including, but not limited to, calcite, quartz, and the like.

That is, the birefringent material of the crystal 130 has a refractive index that depends on the polarization and direction of the incident light. Thus, a ray of light incident upon the birefringent crystal 130 will doubly refract to separate into two rays based on polarization. In particular, birefringent materials have an optical axis such that when the direction of propagation of the ray of light is perpendicular to the optical axis, the portion of the light having polarization perpendicular to the optical axis has a refractive index no (the ordinary refractive index), while the portion of the light having a polarization parallel to the optical axis has a refractive index no (the extraordinary refractive index), which is different from no. Thus, the two portions of light having orthogonal linear polarizations (relative to the optical axis) will refract at different angles, in accordance with Snell's law. A ray of light incident with the birefringent material at an angle not perpendicular to the optical axis (e.g. incident at an angle θ) will also undergo separation. In particular, the first portion of light having a polarization perpendicular to the optical axis will have the ordinary refractive index no, while the second portion of light having a polarization perpendicular to that of the first portion will have a refractive index n according to equation (2):

$$n = 1 \bigg/ \sqrt{\frac{\cos^2\theta}{n_o^2} + \frac{\sin^2\theta}{n_e^2}} \quad (2)$$

In other words, the single ray of light will refract the two rays having orthogonal linear polarizations at different angles, and hence the two rays having orthogonal linear polarizations will be separated by a distance D as a function of a thickness T of the birefringent crystal 130 upon exiting the birefringent crystal 130. Further, in accordance with the principle of optical reversibility, two rays having orthogonal linear polarizations incident upon the birefringent crystal at the appropriate distance will each refract to form a single ray (i.e. combined laser beam 150) being orthogonally polarized (i.e. including the polarization directions of both rays).

The surfaces 304 and 308 are generally arranged such that the input surface 304 is configured to transmit the first laser beam 104 and the second laser beam 108 output from the prism 110 into the crystal body 300 and the output surface 308 is configured to output the combined laser beam 150. In particular, the two laser beams 104 and 108 being parallel to each other, having orthogonal linear polarizations, and separated by a distance D are received at the input surface 304. In accordance with the principle of optical reversibility, the laser beams 104 and 108 refract through the birefringent crystal 130 and exit at the output surface 308 to form the combined laser beam 150. In some implementations, the input surface 304 can include an anti-reflective coating 312 specially configured to transmit the laser beams 104 and/or 108 through the surface 304 with minimal loss from reflection. Further, the output surface 308 can include an anti-reflective coating 316 specially configured to transmit the combined laser beam 150 through the surface 308 with minimal loss from reflection. For example, the anti-reflective coatings 312 and 316 can be specially configured to transmit the laser beams 104, 108 and 150 at the respective incident angles. In some implementations, the anti-reflective coatings 312 and/or 316 can be localized around the area(s) through which the laser beams 104, 108 and 150 are transmitted (i.e. the anti-reflective coatings 312 and 316 may not cover the entire input surface 304 and output surface 308 respectively). For example, the anti-reflective coating 312 is illustrated in FIG. 3 as being localized around the area through which the laser beam 108 is transmitted, while the anti-reflective coating 316 is illustrated as extending over the entire output surface 308.

Figure 4:
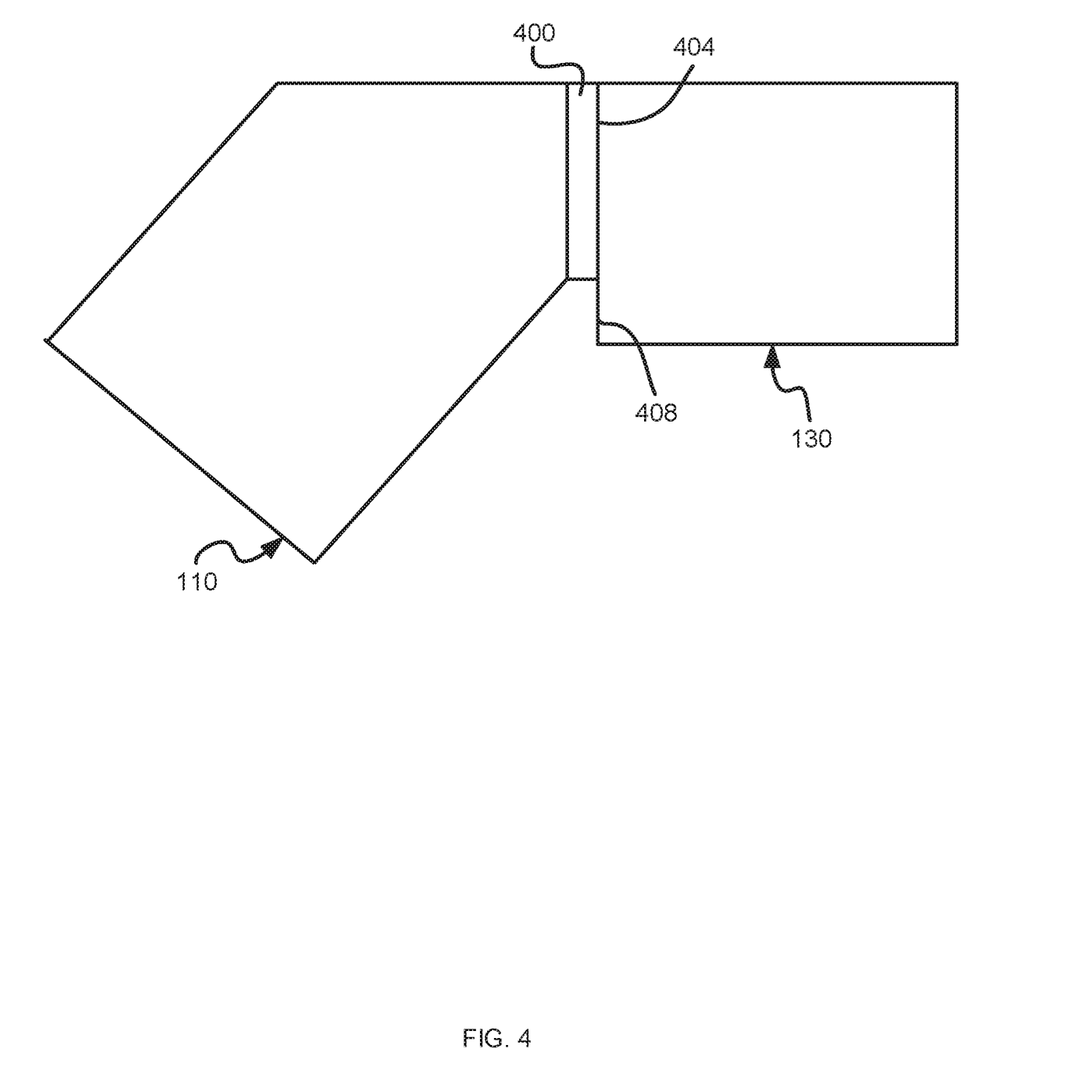
FIG. 4 depicts a bonding layer of the apparatus of FIG. 1, according to a non-limiting implementation.

Referring now to FIG. 4, the prism 110 and the crystal 130 are bonded by a bonding layer 400. The bonding layer 400 comprises a bonding material that is transparent to the laser beams 104 and 108, including, but not limited to optical adhesives, such as epoxies, urethanes, silicones, cyanoacrylates, polyester resin-based materials and the like. In particular, the bonding layer 400 may comprise a bonding material curable via exposure to UV light. Note that the bonding layer 400 is depicted with a thickness for illustrative purposes. The bonding material of the bonding layer 400 is selected according to optical properties (e.g. a similar refractive index to the prism 110 or the crystal 130, or otherwise having properties to not interfere with the laser beams 104 and 108) and physical properties (e.g. shear strength).

In particular, the bonding layer 400 may experience shear stress if the temperature of the environment varies, due to differences in the coefficients of thermal expansion of the prism 110 and the crystal 130. In the present example, the coefficients of thermal expansion of SF10 glass and calcite are, respectively, 7.50×10$^{-6\circ}$ C. and 26.3×10$^{-6\circ}$ C. The shear stress of experienced by the bonding layer 400 is given by equation (3):

$$\tau_{max} = \frac{Ga}{2t}(\alpha_1 - \alpha_2)\Delta T \quad (3)$$

wherein $\tau_{max}$ is the maximum shear stress, G is the shear modulus of the adhesive, a is the maximum bond dimension (e.g. diameter, length, etc.), t is the bond thickness, $\alpha_1$ and $\alpha_2$ are the coefficients of thermal expansion of the bonded material, and $\Delta T$ is the change in temperature.

Thus the maximum shear stress can be determined according to equation (3) and the bonding material of the bonding layer 400 can be selected to have a shear strength to accommodate the maximum shear stress.

As depicted in FIG. 4, the bonding layer 400 adheres the first output surface 206 of the prism 110 to a bonding portion 404 of the input surface 304 of the crystal 130. In particular, the bonding portion 404 includes only a portion of the input surface 304, and hence the input surface 304 also includes a non-bonding portion 408. Accordingly, in the present example, the first laser beam 104 is transmitted from the first output surface 206 of the prism 110 directly to the bonding portion 404 of the crystal 130 via the bonding layer 400. In contrast, the second laser beam 108 is transmitted out of the prism 110 at the second output surface 208, to the air, and then into the crystal 130 at the non-bonding portion 408 of the input surface 304. Thus, for example, the input surface 304 may include the anti-reflective coating 312 on the non-bonding portion 408 of the input surface 304, but not the bonding portion 404.

Figure 5:
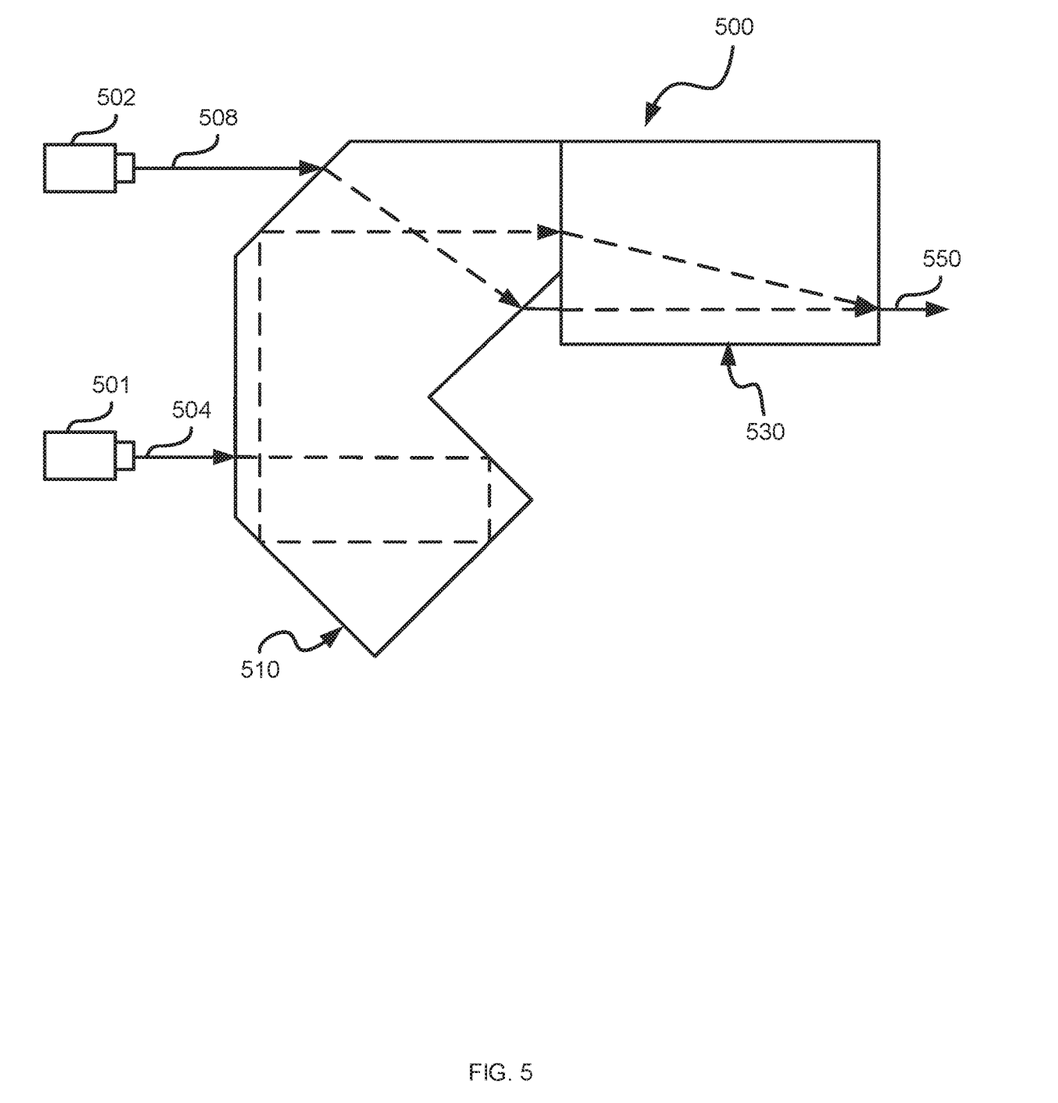
FIG. 5 depicts another example apparatus for combining two laser beams, according to a non-limiting implementation.

Referring now to FIG. 5, a schematic view of another example optical system is depicted. FIG. 5 is similar to FIG. 1, with like elements having like numbers. The optical system includes lasers 501 and 502 having similar functionality to the lasers 101 and 102, particularly, configured to emit, respectively a first laser beam 504 and a second laser beam 508. The first laser beam 504 and the second laser beam 508 are linearly polarized, and in particular, have a same linear polarization.

The apparatus 500 is similar to the apparatus 100 and is generally configured to receive the laser beams 504 and 508 having the same input linear polarization and output a combined laser beam 550 which is orthogonally polarized. The apparatus includes a prism 510 generally configured to receive the laser beams 504 and 508 having the same input linear polarization and output the laser beams 504 and 508 parallel to one another and having orthogonal linear polarizations. In particular, the prism 510 includes one or more TIR surfaces configured to totally internally reflect at least one of the laser beams 504 and 508 to change the polarization. The apparatus 500 further includes a crystal 530 coupled to the prism 510 and generally configured to receive the laser beams 504 and 508 having orthogonal linear polarizations and combine them into the orthogonally polarized combined laser beam 550.

However, as is apparent from FIG. 5, the prism 510 is an octaprism rather than a pentaprism as depicted in FIG. 1.

Figure 6A:
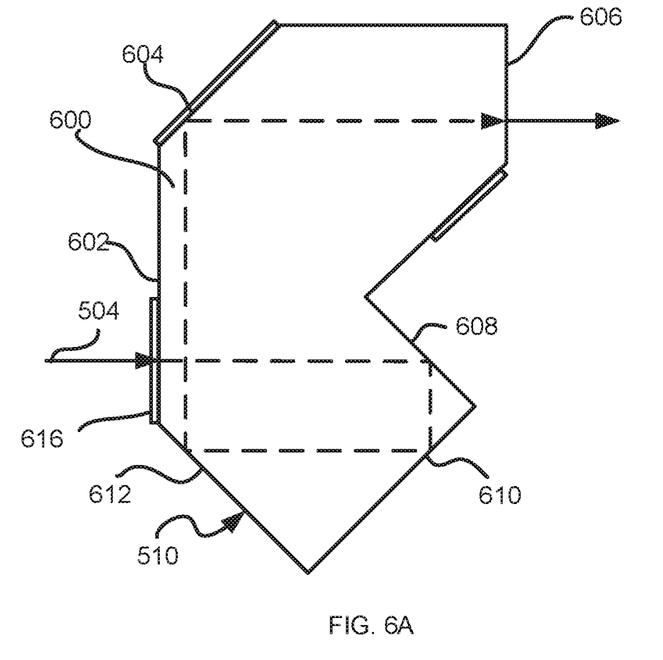
FIGS. 6A and 6B depict optical paths of the laser beams in a prism of the apparatus of FIG. 5, according to a non-limiting implementation.

Referring now to FIG. 6A, the prism 510 will be described in greater detail. The prism 510 includes a transparent prism body 600 including surfaces 602, 604, 606, 608, 610, 612, and 614 forming, in the illustrated example, an octaprism. The transparent prism body 600 is similar to prism body 200 and comprises an optical material transparent to the laser beams 504 and 508, and selected according to optical properties of the material. In the present example, the prism body comprises 2 LLF glass having a refractive index of about 1.54. Solving equation (1) results in a critical angle $\theta_c$ of about 40° for the prism body 600 comprising 2 LLF glass. Thus, when the angle of incidence $\theta_i$ of the laser beams 504 or 508 is greater than about 40°, the laser beam 504 or 508 is totally internally reflected within the prism body 600. In accordance with the Fresnel equations, the laser beam 504 or

508 also undergoes a phase shift upon total internal reflection, with the degree of the phase shift being dependent upon the angle of incidence $\theta_i$. When the angle of incidence $\theta_i$ of the laser beams 504 or 508 is less than about 40°, the laser beam 504 or 508 is transmitted (and refracted) through the surface of the prism body 600.

Figure 6B:
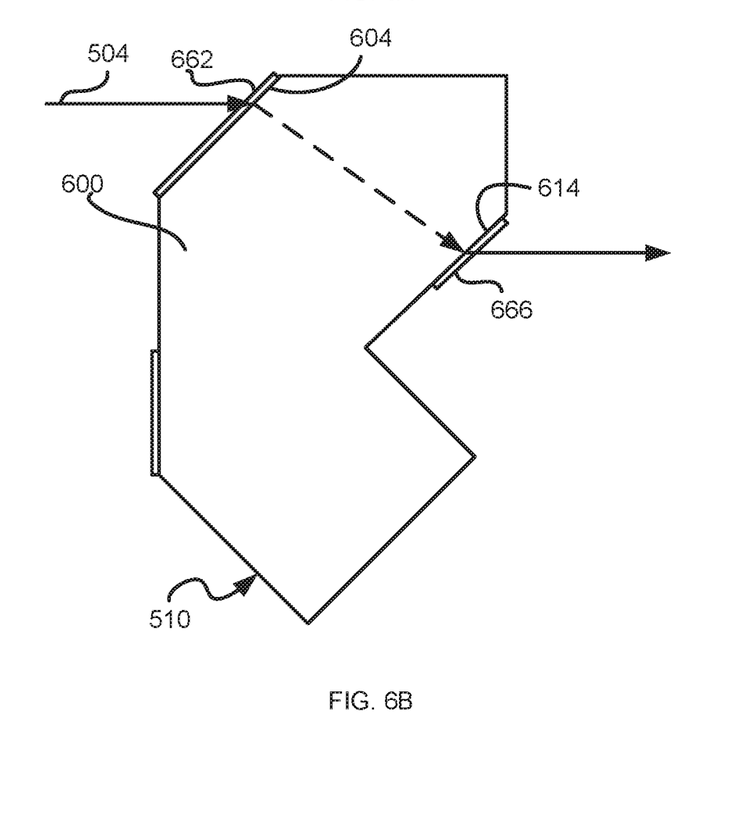

The prism body 600 therefore defines surfaces thereon and is shaped to receive the laser beams 504 and 508, totally internally reflect at least one of the laser beams 504 and 508 to change the respective linear polarization and output the laser beams 504 and 508 with orthogonal linear polarizations. In the present example, the prism body 600 forms an octaprism to totally internally reflect the laser beam 504 four times, and to refract the laser beam 508 therethrough.

The surfaces 602, 604, 606, 608, 610, 612 and 614 are generally arranged, relative to the laser 501 such that the surface 602 acts as a first input surface and is configured to transmit the first laser beam 504 into the prism body 600 and the surface 606 acts as a first output surface and is configured to transmit the first laser beam 504 out of the prism body 600. In other words, the laser beam 504 is received at the first input surface 602 and is transmitted through the first input surface 602 into the prism body 600. In some implementations, at least a portion of the first input surface 602 can include an anti-reflective coating 616 specially configured to transmit the laser beam 504 through the first input surface 602 with minimal loss from reflection. For example, the anti-reflective coating 616 can be specially configured to transmit the laser beam 504 according to the incident angle (in the illustrated example, the incident angle is about 0° from a normal to the first input surface 602). In some implementations, the anti-reflective coating 616 can be localized around the area through which the laser beam 504 is transmitted (i.e. the anti-reflective coating 616 do not cover the entire first input surface 602).

Having entered the prism body 600, the first laser beam 504 continues to through the prism body 600 to the surface 608. The laser beam 504 is incident upon the surface 608 at an angle of about 45°, and hence the surface 608 acts as a TIR surface and the laser beam 504 undergoes total internal reflection within the prism body 600. Similarly, the laser beam 504 undergoes total internal reflection upon incidence at surfaces 610, 612, and 604. In particular, in the present example, the first laser beam 504 is phase shifted at each total internal reflection such that the resulting output linear polarization of the first laser beam 504 is orthogonal to the input linear polarization. For example, based on the index of refraction of 2 LLF glass and the incident angle of 45°, at each total internal reflection, the p component of the laser beam 504 may be advanced by about ⅛ of a cycle (i.e. 45°) relative to the s component. Thus, after four total internal reflections, the p component and s components are ½ of a cycle (i.e. 180°) out of phase, and hence the laser beam 504 is linearly polarized in a direction orthogonal to the input linear polarization. Finally, the laser beam 504 is transmitted through the first output surface 606 out of the prism body 600.

Referring now to FIG. 6B, the surfaces 602, 604, 606, 608, 610, 612, and 614 are generally arranged, relative to the laser 502 such that the surface 604 acts as a second input surface and receives and transmits the laser beam 108 therethrough, and the surface 614 acts as a second output surface receives and outputs the laser beam 108 therethrough. In some implementations, at least a portion of the second input surface 604 and the second output surface 614 can include respective anti-reflective coatings 662 and 666 specially configured to transmit the laser beam 108 with minimal loss from reflection. For example, the anti-reflective coatings 662 and 666 can be specially configured to transmit the laser beam 508 according to the incident angle (in the illustrated example, the incident angle is about 45° from a normal to the second input surface 604 and about 10° from a normal to the second output surface 614). In some implementations, the anti-reflective coatings 662 and 666 can be localized around the area through which the laser beam 508 is transmitted (i.e. the anti-reflective coating 662 and 666 do not cover the entire second input surface 604 and output surface 614). In the illustrated example, the laser beam 508 refracts as it enters the prism body 600, in accordance with Snell's Law.

Thus, in the present example, the prism 510 receives the first laser beam 504 and the second laser beam 508 parallel to each other, and each having the same input linear polarization. The first laser beam 504 is totally internally reflected four times to phase shift the first laser beam 504 to have an orthogonal linear polarization to the input linear polarization (i.e. the first laser beam 504 experiences a half wave sum retardance as a result of four total internal reflections). The second laser beam 508 is refracted as it is transmitted into and exits out of the prism body 600 to maintain its original direction. Accordingly, the prism 510 outputs the laser beams 504 and 508 parallel to each other and having orthogonal linear polarizations.

Returning to FIG. 5, the crystal 530 is similar to the crystal 130. The crystal 530 includes a transparent crystal body including an input surface and an output surface. The crystal body comprises an optical material that is transparent to the laser beams 504 and 508 and having birefringent properties, including, but not limited to, calcite, quartz, and the like. The two laser beams 504 and 508 being parallel to each other, having orthogonal linear polarizations, and separated by a distance are received at the crystal 530. The laser beams 504 and 508 refract through the birefringent crystal 530 and exit at the output surface to form the combined laser beam 550. In some implementations, at least a portion of the input surface can include an anti-reflective coating specially configured to transmit the laser beams 504 and/or 508 with minimal loss from reflection. Further, the output surface can include an anti-reflective coating specially configured to transmit the combined laser beam 550 with minimal loss from reflection. For example, the anti-reflective coatings can be specially configured to transmit the laser beams 504, 508 and 550 at the respective incident angles. In some implementations, the anti-reflective coatings can be localized around the area(s) through which the laser beams 504, 508 and 550 are transmitted (i.e. the anti-reflective coatings may not cover the entire input surface and output surface).

The prism 510 and the crystal 530 can be adhered, for example by a bonding layer (not shown). The bonding layer comprises a bonding material that is transparent to the laser beams 504 and 508, including, but not limited to optical adhesives, such as epoxies, urethanes, silicones, cyanoacrylates, polyester resin-based materials, and the like, particularly those curable via UV light. The bonding material of the bonding layer is selected according to optical properties (e.g. a similar refractive index to the prism 510 or the crystal 530, or otherwise being unobtrusive to the laser beams 504 and 508) and physical properties (e.g. shear strength).

In the present example, the coefficients of thermal expansion of 2 LLF glass and calcite are, respectively, $8.1 \times 10^{-6}$/° C. and $26.3 \times 10^{-6}$/° C. Thus the maximum shear stress can be determined according to equation (3) and the bonding material can be selected to have a shear strength to accommodate the maximum shear stress. Similar to the apparatus 100, the bonding layer adheres the first output surface 606 of the prism 510 to a bonding portion of the input surface of the crystal 530. In particular, the bonding portion includes only a portion of the input surface of the crystal 530, and hence the input surface also includes a non-bonding portion. Accordingly, in the present example, the first laser beam 504 is transmitted from the first output surface 606 of the prism 510 directly to the bonding portion of the crystal via the bonding layer. In contrast, the second laser beam 508 is transmitted out of the prism 510 at the second output surface 614, to the air, and then into the crystal 530 at the non-bonding portion of the input surface of the crystal 530. Thus, for example, the input surface of the crystal 530 may include an anti-reflective coating on the non-bonding portion of the input surface, but not on the bonding portion.

Figure 7:
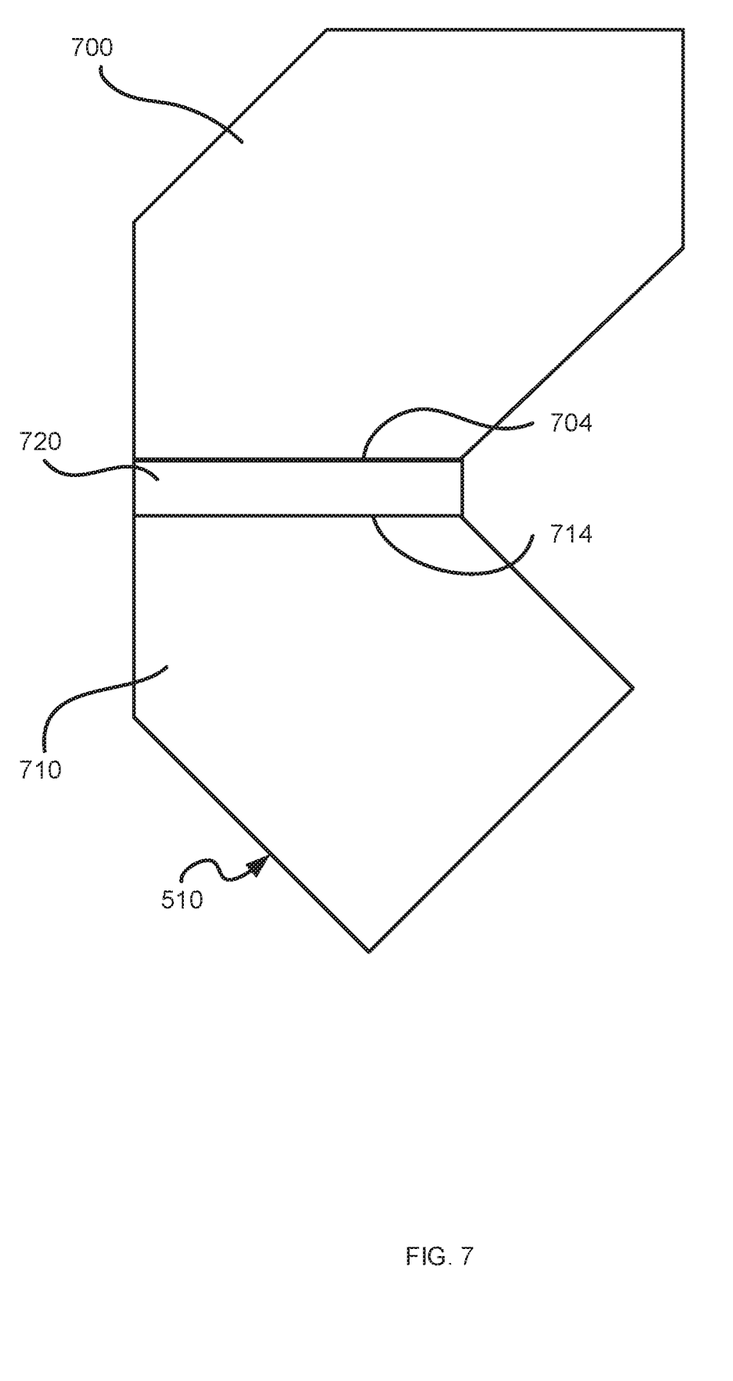
FIG. 7 depicts a bonding layer of a prism of the apparatus of FIG. 5, according to a non-limiting implementation.

Referring now to FIG. 7, the prism 510 can be formed from two prisms 700 and 710 bonded by bonding layer 720 at surfaces 704 and 714. The bonding layer comprises a bonding material that is transparent to the laser beams 104 and 108, including but not limited to optical adhesives, such as epoxies, urethanes, silicones, cyanoacrylates, polyester resin-based materials, and the like, particularly those curable via UV light. Note that the bonding layer 720 is depicted with a thickness for illustrative purposes. The bonding material of the bonding layer 720 is selected according to optical properties to reduce interference with the laser beams 504 and 508. Further, in some examples, the bonding layer 720 is configured to be perpendicular to a direction of propagation of the laser beam 504 to reduce loss due to angular reflection.

The specification is directed to an apparatus for combining laser beams. The apparatus uses a prism to receive two laser beams having the same linear polarization and output the two laser beams with orthogonal polarizations. In particular, the prism utilizes total internal reflection to induce a half wave sum retardance in one of the laser beams. The apparatus further includes a birefringent crystal to receive the laser beams with orthogonal linear polarizations and combine them to form a combined orthogonally polarized laser beam.

As will now be appreciated by a person of skill in the art, there are yet more alternative implementations and modifications possible. For example, the geometry and material of the prism can be altered to change the number of total internal reflections and the polarization of the laser beams. In other examples, the prism can be configured to change the polarizations of both laser beams, resulting in a relative half wave sum retardance between the laser beams. Further, the material and thickness of birefringent crystal can be changed according to the distance of the laser beams output from the prism. In some implementations, the apparatus can include a protective assembly configured to enclose the prism and/or the crystal to protect surfaces from scratches and damage.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An apparatus comprising:
    a prism having a transparent prism body and a plurality of surfaces, the prism configured to:
        receive a first laser beam and a second laser beam each having a same input linear polarization;
        totally internally reflect the first laser beam off ones of the plurality of surfaces on which said first laser beam impinges at greater than or equal to a critical angle $\theta_c$ to change the linear polarization of the first laser beam to an orthogonal polarization;
        refract the second laser beam off ones of the plurality of surfaces on which said second laser beam impinges at less than said critical angle $\theta_c$, thereby maintaining said input linear polarization;
        output the first laser beam having said orthogonal polarization;
        output the second laser beam parallel to the first laser beam having said input linear polarization; and
    a crystal coupled to the prism, the crystal having a transparent crystal body formed of a birefringent material, the crystal configured to:
        receive the first laser beam and the second laser beam from said prism;
        combine the first laser beam and the second laser beam to form an orthogonally polarized combined laser beam; and
        output the orthogonally polarized combined laser beam.

2. The apparatus of claim 1, wherein the prism includes a first input surface, a second input surface, a first output surface and a second output surface arranged such that:
    the first input surface is configured to transmit the first laser beam into the prism body;
    the second input surface is configured to transmit the second laser beam into the prism body;
    the first output surface is configured to transmit the first laser beam out of the prism body with the orthogonal polarization; and
    the second output surface is configured to transmit the second laser beam out of the prism body with the input linear polarization.

3. The apparatus of claim 1, wherein the crystal includes a third input surface and a third output surface arranged such that:
    the third input surface is configured to transmit the first laser beam and the second laser beam output from the prism into the crystal body; and
    the third output surface is configured to output the combined laser beam.

4. The apparatus of claim 2, further comprising one or more anti-reflective coatings on at least a portion of one or more of: the first input surface, the second input surface, the first output surface, and the second output surface.

5. The apparatus of claim 3, further comprising one or more anti-reflective coatings on at least a portion of one or more of: the third input surface and the third output surface.

6. The apparatus of claim 1, wherein the prism is configured to receive the first laser beam parallel to the second laser beam.

7. The apparatus of claim 1, wherein the prism is configured to receive the first laser beam perpendicular to the second laser beam.

8. The apparatus of claim 1, wherein the prism comprises one of: a pentaprism and an octaprism.

9. The apparatus of claim 1, wherein the prism comprises one of: SF10 glass, and 2 LLF glass.

10. The apparatus of claim 1, wherein the crystal comprises calcite.

11. The apparatus of claim 1, further comprising a bonding layer configured to bond a first output surface of the prism to a bonding portion of a third input surface of the crystal.

12. The apparatus of claim 11, wherein the prism is arranged such that:

the first laser beam is transmitted from the first output surface of the prism directly to the bonding portion of the crystal via the bonding layer; and the second laser beam is transmitted out of the prism via a second output surface of the prism and received by the crystal at a non-bonding portion of the third input surface.

* * * * *